(12) United States Patent
Spacek

(10) Patent No.: US 9,797,994 B2
(45) Date of Patent: Oct. 24, 2017

(54) OIL WELL IMPROVEMENT SYSTEM—INTRUSION DETECTION AND RESPOSE SUBSYSTEM

(71) Applicant: Joe Spacek, Brant Lake, NY (US)

(72) Inventor: Joe Spacek, Brant Lake, NY (US)

( * ) Notice: Subject to any disclaimer, the term of this patent is extended or adjusted under 35 U.S.C. 154(b) by 260 days.

(21) Appl. No.: 14/720,893

(22) Filed: May 25, 2015

(65) Prior Publication Data
US 2016/0349357 A1 Dec. 1, 2016

(51) Int. Cl.
| | |
|---|---|
| G01S 7/41 | (2006.01) |
| E21B 29/00 | (2006.01) |
| E21B 33/037 | (2006.01) |
| E21B 33/06 | (2006.01) |
| E21B 33/035 | (2006.01) |
| F42B 15/01 | (2006.01) |
| G01S 7/38 | (2006.01) |
| G01S 7/539 | (2006.01) |
| G01S 13/04 | (2006.01) |
| G01S 13/06 | (2006.01) |
| G01S 15/04 | (2006.01) |
| G01S 15/06 | (2006.01) |
| H01Q 15/14 | (2006.01) |

(52) U.S. Cl.
CPC .............. *G01S 7/41* (2013.01); *E21B 29/007* (2013.01); *E21B 33/037* (2013.01); *E21B 33/0355* (2013.01); *E21B 33/06* (2013.01); *F42B 15/01* (2013.01); *G01S 7/38* (2013.01); *G01S 7/539* (2013.01); *G01S 13/04* (2013.01); *G01S 13/06* (2013.01); *G01S 15/04* (2013.01); *G01S 15/06* (2013.01); *H01Q 15/145* (2013.01)

(58) Field of Classification Search
CPC .......................................................... G01S 7/41
USPC .......................................................... 367/136
See application file for complete search history.

(56) References Cited

U.S. PATENT DOCUMENTS

| | | | | |
|---|---|---|---|---|
| 5,153,366 A | * | 10/1992 | Lucas | F41G 7/007 89/1.11 |
| 6,813,220 B2 | * | 11/2004 | Hicks | G01S 7/523 340/541 |
| 7,245,559 B2 | * | 7/2007 | McDonald | G01S 7/523 340/541 |
| 8,195,409 B2 | * | 6/2012 | Bruno | G01S 3/801 702/56 |
| 8,612,129 B2 | * | 12/2013 | Gagliardi | G08G 3/02 342/41 |
| 8,779,920 B2 | * | 7/2014 | Garnier | G08B 21/12 340/436 |
| 8,791,791 B2 | * | 7/2014 | Blumenthal | G01V 5/0075 235/380 |
| 9,085,950 B2 | * | 7/2015 | Spacek | E21B 29/007 |
| 9,651,649 B1 | * | 5/2017 | Salloum | G01S 3/802 |

(Continued)

*Primary Examiner* — Joshua Kennedy

(57) ABSTRACT

An oil well improvement system having an intrusion detection and response subsystem that provides practical capability to defend offshore drilling platform from surface or subsurface terrorist threats/attacks utilizing modified low-cost off-the-shelf equipment and processor programs. The subsystem processes acoustical and/or RF sensor data to determine contact positions, rates, projected future positions, identification, threat analysis and recommends appropriate soft/hard kill counter measures and further provides control of those countermeasures.

10 Claims, 3 Drawing Sheets

Basic Stand-Alone Subsystem

(56) References Cited

U.S. PATENT DOCUMENTS

| | | | |
|---|---|---|---|
| 2003/0222778 A1* | 12/2003 | Piesinger | G01S 7/415 340/541 |
| 2011/0007606 A1* | 1/2011 | Curtis | G01S 15/04 367/103 |
| 2012/0012022 A1* | 1/2012 | Bormann | F42B 21/00 102/399 |
| 2015/0347902 A1* | 12/2015 | Butler, Jr. | G06N 5/022 706/46 |

* cited by examiner

Basic Stand-Alone Subsystem

Stand-Alone Subsystem With Options

Stand-Alone Subsystem With Remote Resources

OIL WELL IMPROVEMENT SYSTEM—INTRUSION DETECTION AND RESPOSE SUBSYSTEM

CROSS-REFERENCE TO RELATED APPLICATIONS

The present utility patent application claims the benefit of provisional application No. 61/459,895 filed Dec. 20, 2010.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The parent invention relates to disaster prevention system for offshore oil wells and in particular to a supplemental disaster preventive system to provide means to insure human, equipment and environmental safety and associated cost avoidance during the offshore well drilling process under all conceived/feasible accidents/failures conditions. The overall system design concept, related procedures/processes and many associated system components to provide major cost reduction benefits for the entire life cycle (drilling, completion, production and abandonment) for both accident/failure and normal/uneventful operations.

2. Description of Related Art Including Information Disclosed Under 37 CFR 1.97 and 1.98

Shortly after the 2010 offshore oil well catastrophe in the Gulf of Mexico, it became obvious that British Petroleum (BP), the entire oil industry, and/or the US Government were unprepared to effectively stop the gushing oil or the means to clean it up. Throughout the first two plus months of the disaster numerous re-sealing, capturing, clogging, killing and capping techniques were unsuccessfully attempted and several high risk/cost 'normal' well drilling processes were brought to light. The successful 20 July re-seal, capture and cap 'Rube Goldberg'/'Kluge' (said with admiration) was a simplistic but effective temporary solution for the catastrophic symptoms of the problem—where the primary operative phrase is 'temporary solution for the catastrophic symptoms'. The enormous somewhat/sometimes unquantifiable costs of the (or of a future) incident includes: Human life Environment, Drilling platform Well (the equipment and the associated labor and its potential production) Equipment and labor associated with the numerous re-seal, capture, and cap 'quick fixes', Equipment and labor associated with the relief/kill wells, Gulf clean-up, Tourist and fishing industry, Local community Public opinion relating to the oil industry and the government Nation and international financial markets. As offshore oil drilling/production continues in the future it seems only rational that the government as well as oil industry itself would demand, as a prime priority the development of improved equipment/systems and processes. Whatever the cause(s) (human neglect/error, equipment failure, etc.) of the 2010 oil well disaster and whatever means are developed to insure no such similar failure and/or related impacts reoccurs, there are potentially more likely and more damaging events—specifically natural disasters and (accidental or deliberate) human intervention that must also be addressed. The focus of the 'quick fix' was to stop/control the symptoms of the immediate catastrophe—the gushing oil. What is needed is an overall systems design and implementation approach that provides the means to reduce/eliminate the causes and impacts of any conceived/realistic threats to oil wells in the future and further provides more reliable, practical and cost effective means to accomplish the oil well drilling task.

BRIEF SUMMARY OF THE INVENTION

The primary design objective of the parent invention was to provide an offshore oil well improvement system using an overall systems design and implementation approach that provides the means to reduce/eliminate the causes and impacts of any conceived/realistic threats to oil wells in the future and further provide more reliable, practical and cost effective means to accomplish oil well drilling. The parent invention is composed of two functional and physically integrated subsystems, the Multi-Function Well Subsystem (MFWS) and the Surface/Sub-surface Intrusion Detection and Countermeasures Subsystem ($S^2ID\&CMS$). The ($S^2ID\&CMS$) provides the means to detect, track and classify surface/sub-surface objects about a specific oil well or group of oil wells and provides the means to evaluate and eliminate threats. As all elements are based on existing proven technology, the development cost risk is minimum. As the system design includes a major focus on the physical implementation and operation, the implementation and operational cost risk is minimum. Considering the pure human and environmental safety, the pure dollar and cents (or multi-million/billion dollar) cost avoidance and/or the potential cost savings/reductions (for any or all such reasons) it is a significant understatement to suggest that features of the present invention should be integrated with other planned improvements, and incorporated on all oil wells.

BRIEF DESCRIPTION OF THE SEVERAL VIEWS OF THE DRAWINGS

These and other details of the present invention will be described in connection with the accompanying drawings, which are furnished only by way of illustration and not in limitation of the invention. The drawings are intended to provide an introductory overview of major subsystem elements that along with other unique system supporting devices are further/comprehensively defined in the 'Detailed Description Of The Invention'.

Figure 1:
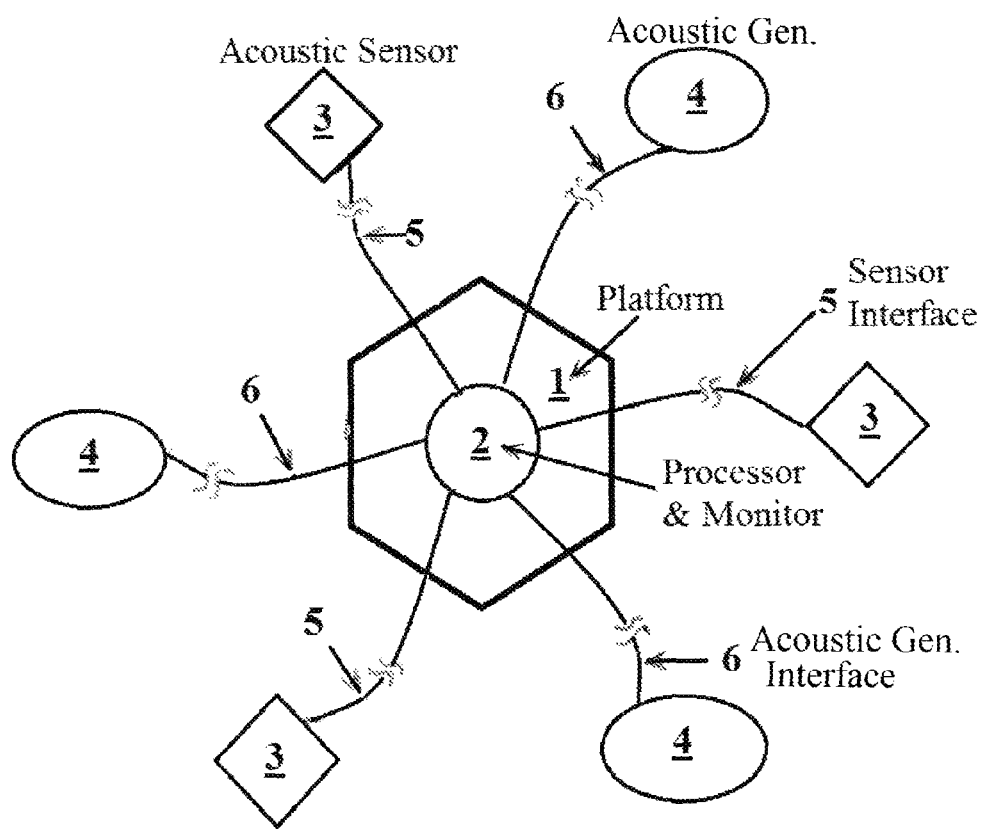
FIG. 1 is a functional/interface flow diagram depicting the basic stand-alone subsystem.
Figure 2:
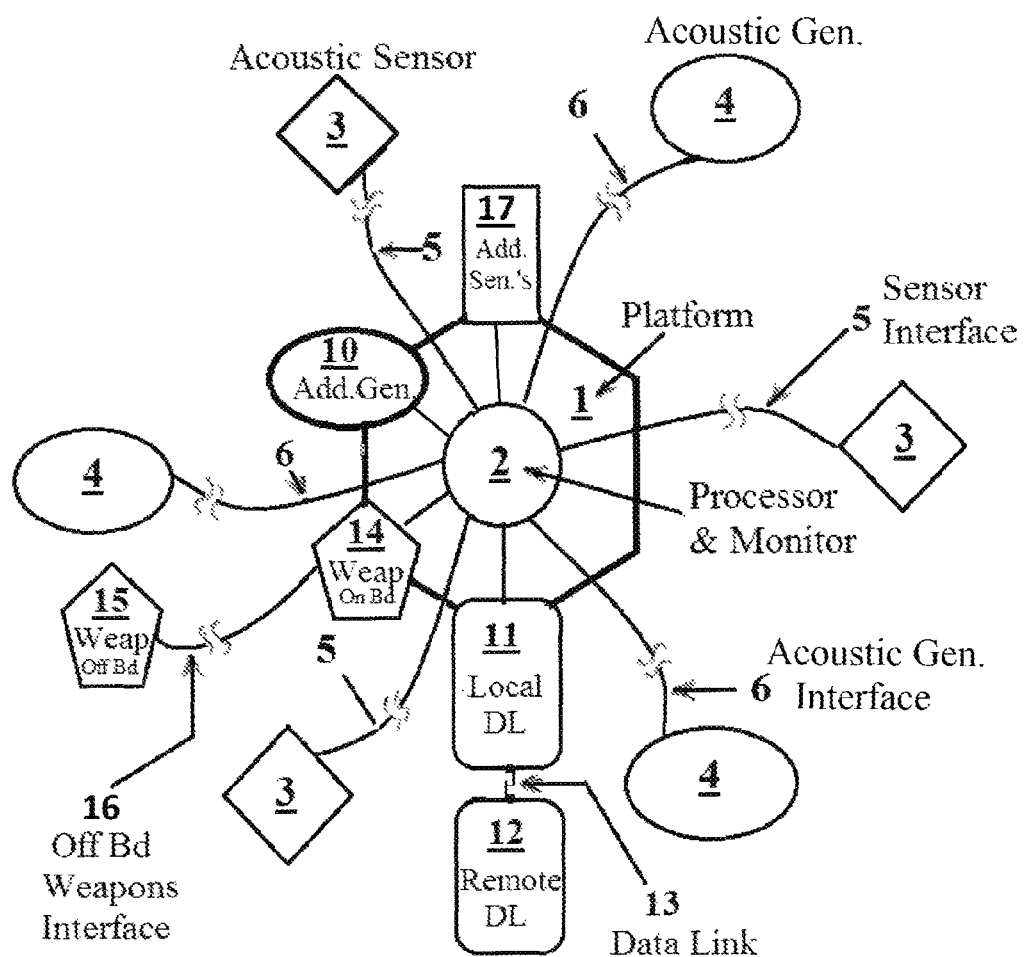
FIG. 2 is a functional/interface flow diagram depicting the basic stand-alone subsystem with various options.
Figure 3:
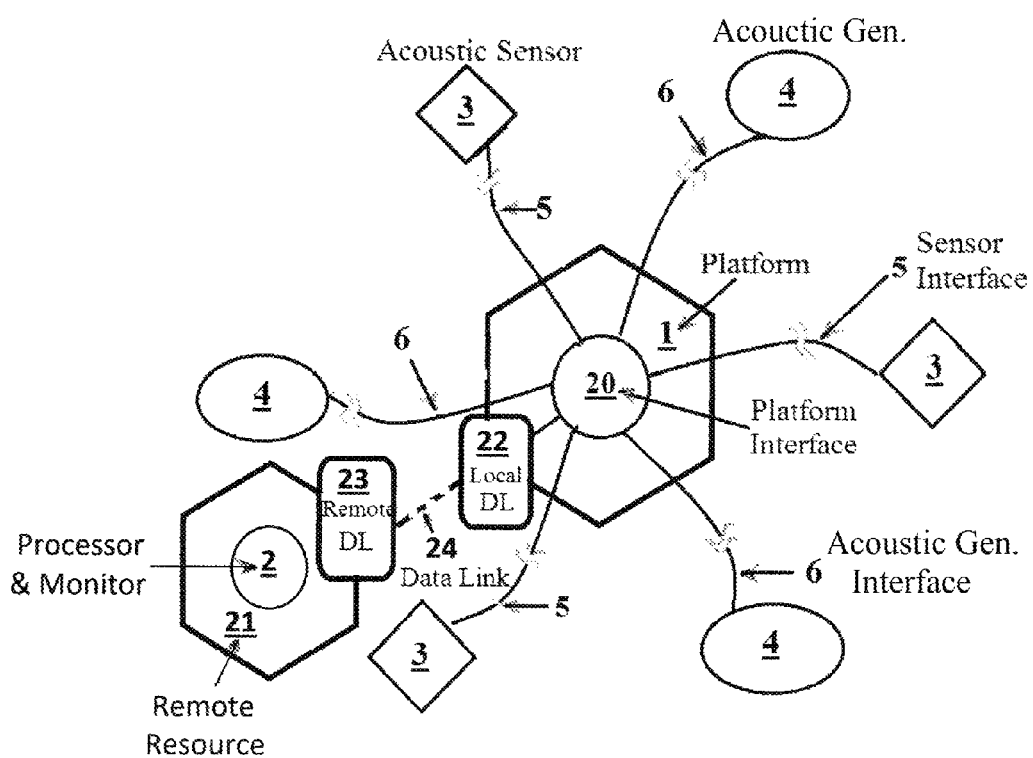
FIG. 3 is a functional/interface flow diagram depicting the standard stand-alone subsystem with remote resources.

It is noted that FIGS. 1, 2 & 3 do not depict electronic data formatting/line driver type devices.

While reviewing these figures it would be helpful to keep in mind the two primary objectives/principles of the proposed subsystem specifically;

Offshore gas/well drilling platforms are soft targets for a terrorist attack and the financial, human life and environmental impacts of such an attack would likely be massive, and Although a number of existing systems/subsystem could be modified and utilize to effectively address the technical aspects of this problem, the development and/or implementation costs of such systems/subsystems would likely be enormous (hundreds of million-billion dollar range), making such an approach totally impractical. Reducing development and implementation costs one (or more) order(s) of magnitude is necessary to even consider developing/deploying such a system/subsystem.

FIG. 1

Depicts the basic standalone subsystem. It provides the most (cost & tactical) effective and critical capability for the detection, identification/classification, tracking and develops alerts and recommendations of surface and subsurface contacts and further provides soft kill countermeasure means to decoy surface or subsurface acoustical homing devices as well as the means to disturb/interrupt human undersea operations.

Terrorist threats would likely include various undersea resources (such as skin divers with or without undersea vehicles, torpedoes, mini-submarines) utilizing rudimentary acoustic device, or surface crafts with or without rudimentary homing missiles.

Although this basic subsystem does not incorporate the countermeasure means to destroy surface craft, it does provide the means to detect, identify/classify and provide threat alerts and recommendations for such threats and it is assumed rudimentary manual countermeasures (such as short range shoulder launched guided missiles) could be implemented to act on the alerts and recommendations provided by the computer/processor, display monitor and control subsystem (2).

The figure depicts an oil/gas well drilling platform (1) wherein a computer/processor, display monitor and control subsystem (2) is physically on/in the platform (1), the processor P/O (2) interfaces (three shown) with sensor interface cables (5) connected to passive acoustical sensors (3) that are capable of acoustic spectrum analysis and direction finding. The processor P/O (2) interfaces (three shown) with amplifier/generator interface cables (6) connected to three acoustical amplifiers/generators (4). The sensor interface cables (5) provide acoustical sensed information to the processor P/O (2) wherein the processor provides filtering and other such controls to the it acoustical sensors (3) and/or there data.

Generator interface cable (6) receives acoustical jamming/decoy information developed by the processor P/O (2) and provides this control data to the acoustic generators (4).

Interface cables items (5 & 6) are typically >500 feet long. Acoustical sensors (3) and acoustic amplifiers/generators item (4) are installed below the sea surface and tethered from surface buoys or from the seabed. They are typically located >500 feet from the platform (1). Unit (3)'s are semi-equally spaced from each other and unit (4)'s are semi-equally spaced from each other. The processor P/O (2) receives acoustical data from units (3), detects contact information, compares the contact information of the different positioned unit (3)'s and triangulates the contact data to determine range & bearing, identifies/classifies, tracks, projects future positions, and provides threat warnings and recommendations. The processor P/O (2) further analyzes the contact data and develops acoustical decoy and/or distract information and provides this as acoustical input/drive to the acoustic generators (4). The processor P/O (2) also filters the acoustical data from units (3) (to insure local generated noise sources such as the drilling platform or the decoys unit (4)'s do not degrade/interfere with the tracking capability).

With respect to practical objectives—development and implementation costs; Unit (2).

The equipment is compatible with numerous midrange commercial off-the shelf desktop computers and monitors.

The detection triangulation, identification/classification, tracking and the future contact positioning sub-programs could be developed by modifying available USN (USCG/other) computer programs. Other sub-programs including dynamic acoustical sensor filtering (filtering local noise sources such as the drilling platform/the acoustic generators), threat warning, recommendations and the analysis of contact's acoustical homing device and the development of decoy/distract acoustical response would require new/unique computer sub-program development. Such development risks/costs could run in the mid-high five figure range but the implementation/deployment risks/costs would be minimal.

Unit (3).

The equipment (spectrum analysis and direction finding) performance requirements/capabilities are compatible with available expendable (low-cost, <$500) ASW sonobouys used by the USN/NATO. Necessary modifications include changing; the interface media, the power source, developing the means to physically deploy/stabilize the device and developing internal or external control interface for acoustical filtering. Such development and implementation risks/costs would be minimal.

Unit (4).

Although the unit is presently not available in the commercial or in military market, the device is quite simplistic. Basically it is a high power underwater, computer driven/controlled acoustical amplifier-speakers. Such development and implementation risks/costs would be minimal.

FIG. 2

Depicts the stand-alone subsystem with options and provides various additional capabilities by adding other sensor and countermeasure devices.

Additional Platform sensors (17) include RF sensor devices such as; radar, identification devices and/or passive electronic devices. It is assume that most (if not all) drilling platform incorporate a radar and an identification devices. Adding an interface and incorporating the associated sensed data into the computer/processor would have minor development and implementation risks/costs.

Data link (11-13) provides external sensor/information sources, such as data military platforms, satellite data, FAA data or data from other gas/oil well drilling platforms. It is assumed that 'some type of' communications from such sources are presently available on existing drilling platform. Re-formatting this ('some type of') data to be compatible and interface with the processor P/O (2) and incorporating the formatting equipment and integrating such sensed data into the processor program would be a minor development and implementation risks/costs. Additional acoustical generator (10) is similar to unit (4) but it is located on the platform (1) or at a central location with respect to the other generators (4). This device (10) interfaces with the computer/processor P/O (2) and is used to provide and occasionally unique acoustical source to dynamically calibrate the direction finding/triangulation process associated with the contact data of the acoustical sensors (3). The development and implementation cost/risk associated with addition of this device (10), the physical interface with and the program changes associated with the computer/processor unit P/O (2) is extremely low. Additional platform weapons

(14) provides enhanced countermeasures. These weapons include hard & soft kill devices such as; rocket deployed depth charges, torpedoes, guns, homing missiles, chaff and RF/IR decoy/jammers. The development cost/risk associated with the addition of this these various weapons and the associated interface & programming would be minimal, while implementation costs would vary from minor to significant.

Incorporating off-board weapons (15) provides enhanced countermeasures. These weapons include hard & soft kill devices such as deployed & depth charges, buoy launched chaff and buoy RF/IR decoy/jammers. Off-board weapons interface cable (16) shown interfacing (15) & (14) (using artistic license) actually interfaces (15) to (2). The development and implementation cost/risk associated with the addition of this these various weapons and the associated (physical & programming) interface with the computer/processor (2) is minimal.

FIG. 3

Depicts the stand-alone subsystem with remote resources. This subsystem mirrors the basic stand-alone subsystem presented on FIG. 1 with the exception that the computer/processor display monitor & control subsystem (2) is physically relocated to a remote resources (21) and replaced by a platform interface device (20) and a wide-band bi-directional data link (22, 23 & 24). This data link provides remote computer/processing, displaying monitoring and control of the subsystem. Not depicted on the figure are various sensors and/or weapons that may be part of the remote resource (21). The remote resource could be a land-based, sea-based or air based platform—typically a military platform. As a minimum the remote resource would provide the operator support function and this function could be shared with other oil/gas drilling platform subsystems. As a maximum the remote resource could provide more advanced/capable supporting sensors and countermeasures. The development cost/risk associated with this subsystem configuration is considered minimal and the implementation costs/risk would be transferred to a different responsible party/agency. Many of the improved capability options identified in the stand-alone subsystem with options (as depicted on FIG. 2) may be unnecessary if they are part of the remote platform.

FIG. 2-3 Composite

Although not depicted on a separate figure, the standard stand-alone subsystem with remote resources (FIG. 3) could incorporate any or all of the various individual options addressed in FIG. 2.

FIGS. 1/2 & 3 Composite

Although not depicted on a separate figure, the standard stand-alone subsystem with remote resources (FIG. 3) could incorporate an equipment/operational mix with either the stand alone subsystem depicted on FIG. 1 or 2, where some/all elements of the computer/processor, display monitor & control subsystem are duplicated on both the remote resource and the local platform. Such could provide operational redundancy, local utilization of classified information, etc.

DETAILED DESCRIPTION OF THE INVENTION

The $S^2$ID&CMS provides the means to detect, track and classify surface/sub-surface objects about a specific oil well or group of oil wells. It also provides the means to evaluate potential threats and 'Hard and/or Soft Kill' the threats. The subsystem elements are identified in four categories as follows: 1. Major existing military type platform equipment that provides short range AAW, ASUW and ASW capability including such items as: Radars (search and fire control), IFF, ESM, Sonar, Active and Passive Decoys (Acoustic, RF and IR) and Hard Kill Weapons (guns, missiles, torpedoes and depth charges). 2. Major existing military/commercial type equipment such as: LAMPS Helicopter and ROV's. 3. Unique equipment such as: Array(s) of sea surface tethered/anchored remotely controlled RF and IR generators/decoys, Array(s) of below sea tethered, remotely monitored Passive Acoustic Sensors (PAS) and a platform mounted PAS, Remotely controlled acoustic generators/decoys and remotely controlled acoustic corner reflectors and Interface, Processing and Display Monitor and Control. 4. Trained Operator(s).

Many of the terms such as 'short range' and 'weapons' are quite subjective and since the primary threat is considered to be quite rudimentary the following are identified as design guidance: A Radar (search, fire control and integrated IFF) capability such as the MK92 CAS, Weapons such as the Standard Missile, Harpoon and Mk46 Torpedoes would work but have a significant over kill for the anticipated threat. Other Hard Kill weapons could include such items as a MK15 CIWS, a 3" gun, SUBROC and Helicopter launched depth charges and shoulder type fire and forget anti-air and anti-surface missiles.

$S^2$ID&CMS Detail Design Notes/Information. The acoustic sensors and arrays are conceptually based on USN ASUW and ASW detection and processing techniques. The subsurface piggy-back depth angle sensor and the related arrays depth determination is unique but based on the triangular processing of the bearing and range. It is anticipated the sensed 'depth angle' will be compromised by sea-floor and surface reflections/bounce, but it is assumed that integrating over time and averaging the three differently located sensors data will provide tangible results. The tracking, classification, threat analysis and threat response recommendations are also based on USN processing The RF, IR and acoustic generators and corner reflector(s), and their associated array, are conceptually based on USAF and USN air tactical counter-measures (stand-off jammers and gate stealers) and USN submarine counter-measures (decoys). The Light Airborne Multi-Purpose System (LAMPS) operations are based on the USN LAMPS MK111 ASW and ASUW techniques.

The following describe a single well installation utilizing a USN or USCG Ship for the 'Major existing military type platform equipment that provides short range AAW, ASUW and ASW capability. It is assumed alternative interfaces, operations and array configurations could be derived for well platform based equipment and/or multiple well implementations. The Radar and associated IFF and Electromagnet (passive detection) Sensor (EMS) are the 'eyes' for above the surface, while the passive acoustic sensors are the 'eyes' for below the surface. The acoustic sensor array provides subsurface and surface detection data and the means required to triangulate the sensors detections to determine Bearing, Range and Depth. The outputs of the acoustic sensors and control signals for all generators (RF, IR and acoustical) interface with (via cable) an Array Distribution Unit (ADU). The ADU (data/controls) interfaces (via cable) with to the Data and Signal Formatter (D&SF). D&/SF on a (oil well) platform digitizes and serializes the signals. The digitized and serialized signal is sent to the platforms RF Data Link and then the ship's RF Data Link. The data is then sent to the Processor where is processed for display monitoring and display interface, detection support (bearing, range and depth determination for acoustic contacts) and tracking, classification, threat analysis and related recommendations, as well as historical storage for air, surface and subsurface contacts. The processed data and information is then sent to the Display Monitor and Control Unit. A trained Operator views/reviews the data and information and determines and initiates appropriate actions. The processing will include an operator selectable auto threat-quick reaction 'soft-kill'/decoy mode, allowing the program to automatically control the RF, IR, acoustical generators and corner reflectors. The controls are sent to the appropriate selected unit(s) (specific sensor and/or generator) via the Processor, RF Data Link, Data Formatter, Array Distribution Unit and then to the appropriate unit. LAMPS Helicopter interfaces via its own data link. If ROV actions are required, a stand-alone interface, monitor and control system identical to the existing ROV's will be used. If the Ship has a sonobuoy receiver system compatible with the number and type of sonobuoys in the array the sensors could directly (via RF) interface with the ship. It is assumed the sensor (RADAR, IFF, and ESM etc.) and weapons on a USN or USCG Ship identified as short range AAW, ASUW and ASW capable would well serve this mission, particularly as supplemented. The RF and IR Generators/Decoys are standard simplistic active noise or repeater source similar to numerous such devices used by the USN and USAF. The device shall be externally stimulated and controlled by the Processor to produce outputs capable of: Being totally silent, Producing broadband continuous wave frequencies over the entire spectrum of anticipated homing devices, at power levels greater than the anticipated homing device's transmitter, Producing a controlled variable delayed pulsed repeater outputs compatible with the pulse-width and spectrum of an anticipated active pulsed homing device. The controlled variable delay shall have a minimum range from; <1 us to greater than 10 ms. The repeater will further have controlled power levels from a maximum equaling the anticipated power of a homing device's transmitter, to minimum power level of zero. The Passive Acoustic Sensor (PAS) is conceptually derived from a modification of the standard AN/SSQ 53 Directional Frequency Analysis and Recording (DIFAR) Sonobuoy. The modifications include; Providing an external power source via cable (vs. internal battery power), Removing the antenna output interface and utilize output via cable interface format, Mounting two unit's piggy back on different axis (one producing bearing angle and the other depth angle) and Increasing buoyancy to insure unit with attached cable (and attached Acoustic Generator has significant positive buoyancy. The Acoustic Generator (AG) is a simplistic active acoustic noise source similar to numerous such devices used by the USN. The totally unique feature of the device is that shall be externally stimulated and controlled by the Processor to produce outputs capable of: Being totally silent, Emulating the acoustic signature of an oil well's sea-floor and platform, with power levels equal to ten times the said well, Producing broadband continuous wave acoustic frequencies over the entire spectrum of anticipated homing devices, at power levels greater than an anticipated homing device's transmitter and Producing a controlled variable delayed pulsed repeater output compatible with the pulse-width and spectrum of an anticipated active pulsed homing device. The controlled variable delay shall have a minimum range from; less than 10 us to greater than 10 ms. The repeater will further have controlled power levels from a maximum equaling the anticipated power of a homing device's transmitter, to a minimum power level of zero. The Acoustic Corner Reflector (ACR) is a simplistic passive decoy type device. It is basically composed of two flat acoustical reflective crossing plains (crossing in the center) at 90 degrees that reflects an acoustical signal back in the same angle it was received. The ACR further includes a remote controlled element that rotates (from the center) one of the plains to form a dual flat surface. The ACR is deployed with weighs on the sea-floor and/or tethered at different depths. The PAS and AG units will be connected (via cable or be physically joined) and typically deployed in functional sets of three or four typically @ equal distance from each other and equal distance about a specific well (or in other functional sets about a group of wells). Each of the PAS, AG and/or ACR units will be tethered from the sea-floor to pre-determined depths. The RF & IR generators will be tethered to the sea surface. The said tethered cables could include various combinations of sensors/decoys. The sea-floor will hold the tethered cable with weights capable of insuring it does not change its position (depth, lat. and long.). The cable length from the tethered weight to the sea-floor to platform shall be the planned distance plus about one and a half times the sea depth (for future recovery/maintenance). A single (non-joined) AG will be mounted on the underside of the surface platform providing the means to calculate (via the processor) the exact position and aspect of the joined PAS and AG devices. The ROV(s) is identical to such devices used by the oil industry for deep off-shore drilling but this unit's interface cables will be lengthened so it can travel greater than two miles from the platform. The ROV(s) provide the means to view, evaluate and move delayed fused under-sea explosives. The Array Distribution Unit (ADU) function only acts as a convenient physical wire/cable distribution center. The Data and Signal Formatter (D&SF) is an active electronic data and signal formatting device located on the platform. The 'formatting includes: Analogue to Digital conversion, Digital to Analogue conversion and Multiplexing and De-multiplexing. The D&SF will have the minimum through-put capacity (bandwidth) to simultaneously handle—From Sensors: Acoustic outputs of eight type AN/SSQ-53 Sonobuoys Plus 50% (control, feedback, status, etc.)—To Sensors and Generators: Approximately 25% of the 'from sensors' bandwidth. It is assumed devices matching/exceeding these requirements are available 'off-the shelf' (from Industry/US Government). The RF Data Link is a common device used by industry and the government. The device converts serial (cable media) electronic data/signals to RF for transmission to another location via an antenna and likewise receives RF and converts it to serial electronic data/signals. The capacity (bandwidth) must be compatible with the required data/signals of the system, as identified for the D&SF. It is assumed devices matching/exceeding these requirements are available 'off-the shelf' (from Industry/US Government). The above assumes a separate in-place ship to helicopter (LAMPS) data link. The Processor includes a computer and specialized computer programs. The Processor provides critical functions related to the surface/sub-subsurface objects: Detection, Position, Tracking, Classification, Threat Analysis and Related Countermeasure recommendations. The processor also provides interface for the Display Monitor and Control Unit. The processor further provides for sensor position and aspect calibration, operator training via simulation and historical operational recording. It is assumed the computers are in-place on the ship, or a computer matching/exceeding the required process capacity and speed are available 'off-the shelf' commercially. The 'specialized computer programs would have to be developed, but the USN utilizes similar functional software for their AAW, ASUW and ASW mission. If such were made available the development (time, cost and risk) would be reduced by an order of magnitude. The Display Monitor and Control Unit (DM&CU) provides for the operator to system interface. The Light Airborne Multi-Purpose System (LAMPS) is identical to that used by the USN for surface and sub-surface detection, localization and engagements. Although specific operational displays, modes, functions or controls are not specified in detail at this time, it is assumed the DM&CU is in-place on the ship or a unit matching/exceeding the requirements is commercially available—large touch-screen monitor would well serve the all requirements. It is understood that the preceding description is given merely by way of illustration and not in limitation of the invention and that various modifications may be made thereto without departing from the spirit of the invention as claimed.

The invention claimed is:

1. An offshore surface and sub-surface situation monitoring, control and countermeasures subsystem incorporating: an array of two or more passive acoustic sensors, an array of two or more remotely controlled acoustical generators, a computer/processor, display monitor & control subsystem; wherein the two or more of the acoustic sensors are positioned below the sea surface around the location of an offshore platform or group of platforms, wherein the two or more of the acoustic sensors incorporate both acoustic amplitude directional finding and acoustic spectrum analysis modes of operation;
   wherein the array of remotely controlled acoustic generators are positioned below the sea surface around the location of an offshore platform or group of platforms, wherein the remotely controlled acoustic generators interface with and are individually controlled by the computer/processor, display monitor and control subsystem and provide modes of operation including wideband acoustic noise jamming, narrow band acoustic repeater or acoustical emulation of the spectrum of a known noise sources;
   wherein the computer/processor, display monitor & control subsystem interfaces with the passive acoustical sensors, wherein the a computer/processor, display monitor & control subsystem processes acoustic contact data from the acoustic sensors, wherein the computer/processor, display monitor & control subsystem processes the contact data to detect, identify, classify, tracks range & bearing, predict threat levels, threat warnings and develops recommended countermeasure responses.

2. The offshore surface and sub-surface situation monitoring, control and countermeasures subsystem of claim 1 further incorporating a bi-directional data link device wherein the bi-directional data link device incorporates a local transceiver located on or near an offshore platform and a remotely located transceiver, wherein the local transceiver receives and transmits sensor contact data to a remote transceiver, wherein the remote transceiver receives the sensor contact data and processes the data in a remotely located computer/processor, display monitor & control subsystem, wherein the remotely located computer/processor, display monitor & control subsystem process this or other available remote sensor data and controls remotely located countermeasures or wherein the countermeasures controls are transmitted to the local transceiver wherein the controlled/processed data interfaces with the local countermeasures device(s).

3. The offshore surface and sub-surface situation monitoring, control and countermeasures subsystem of claim 2 further incorporating a data link interface with off-platform military resources including ships/boats, aircraft or land based sensor or weapons.

4. The offshore surface and sub-surface situation monitoring, control and countermeasures subsystem of claim 1 further incorporating hard kill weapons; wherein the computer/processor, display monitor & control subsystem further interfaces with and develops recommended countermeasure responses and control for the hard kill weapons.

5. The offshore surface and sub-surface situation monitoring, control and countermeasures subsystem of claim 4 further incorporating a processing mode to automatically implement the recommended hard kill defensive countermeasures.

6. The offshore surface and sub-surface situation monitoring, control and countermeasures subsystem of claim 1 further incorporating local/platform RF sensor device(s), wherein the local/platform RF sensor device(s) include radar, contact identification/IFF or passive RF sensor devices; wherein the computer/processor, display monitor and control subsystem further interfaces with the RF sensor device(s).

7. The offshore surface and sub-surface situation monitoring, control and countermeasures subsystem of claim 6 further incorporating the capability to provide defensive countermeasures against ship/boat launched missiles, wherein related soft kill/non-lethal defensive countermeasures devices are incorporated in the subsystem, wherein these soft kill defensive countermeasure devices include chaff, flares or RF/IF decoys/jammers and wherein the computer/processor, display monitor & control subsystem further interfaces with these devices and further incorporates a processing mode to recommended these soft kill defensive countermeasures or automatically implement their deployment.

8. The offshore surface and sub-surface situation monitoring, control and countermeasures subsystem of claim 1 further incorporating interface device(s), wherein the interface device(s) receives or transmits data/information from remote sources to the local/platform computer/processor, display monitor & control subsystem, wherein the remote sources include military data, satellite data, FAA data or data from other platforms.

9. The offshore surface and sub-surface situation monitoring, control and countermeasures subsystem of claim 1 further incorporating a processing mode to automatically implement the recommended soft kill defensive countermeasures.

10. The offshore surface and sub-surface situation monitoring, control and countermeasures subsystem of claim 1 further incorporating an additional remotely controlled acoustical generator wherein this additional remotely controlled acoustical generator is located centrally located with respect to the other remotely controlled acoustical generators, wherein the additional remotely controlled acoustical generator interfaces with and is controlled by the computer/processor, display monitor & control subsystem.

* * * * *